(12) United States Patent
Takahashi

(10) Patent No.: US 7,106,467 B2
(45) Date of Patent: Sep. 12, 2006

(54) INFORMATION PROCESSING APPARATUS, DEVICE MANAGEMENT APPARATUS, NETWORK SYSTEM, METHOD OF COPING WITH A DEVICE PROBLEM, AND STORAGE MEDIUM

(75) Inventor: Toshio Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 09/870,175

(22) Filed: May 30, 2001

(65) Prior Publication Data

US 2002/0051186 A1  May 2, 2002

(30) Foreign Application Priority Data

Jun. 2, 2000  (JP)  ............... 2000-166649

(51) Int. Cl.
*G06K 15/00* (2006.01)
*H04N 1/00* (2006.01)

(52) U.S. Cl. ..................... 358/1.15; 358/405
(58) Field of Classification Search ............... 358/1.15, 358/1.16, 1.18, 1.17, 1.14, 400, 401, 406, 358/443, 471, 405
See application file for complete search history.

(56) References Cited

U.S. PATENT DOCUMENTS

| | | | |
|---|---|---|---|
| 5,138,618 A | 8/1992 | Honda et al. ................ 714/25 |
| 5,392,095 A | 2/1995 | Siegel ........................... 399/8 |
| 6,072,902 A * | 6/2000 | Myers ....................... 382/167 |
| 6,202,177 B1* | 3/2001 | Fujii ........................... 714/40 |
| 6,591,256 B1* | 7/2003 | Friedman ..................... 706/45 |
| 6,906,814 B1* | 6/2005 | Aonuma et al. ........... 358/1.15 |
| 2001/0003827 A1* | 6/2001 | Shimamura ................ 709/206 |
| 2001/0040689 A1* | 11/2001 | Uda et al. ................. 358/1.13 |
| 2002/0031390 A1* | 3/2002 | Kobayashi et al. ......... 400/709 |
| 2002/0131067 A1* | 9/2002 | Cox ........................... 358/1.14 |

FOREIGN PATENT DOCUMENTS

| | | | |
|---|---|---|---|
| JP | 403252720 A | * | 11/1991 |
| JP | 11-53152 |  | 2/1999 |
| JP | 02002207415 | * | 7/2002 |

* cited by examiner

*Primary Examiner*—Jerome Grant, II
(74) *Attorney, Agent, or Firm*—Milbank, Tweed, Hadley & McCloy LLP

(57) ABSTRACT

A network system with which a user can easily cope with various problems of a device and a maintenance service side can manage a device efficiently is provided. A user side transmits information that is a quantified version of a sensory problem, which a user feels when the user uses a device (printer), to the maintenance service side. The maintenance service side returns information for coping with the problem, which is based on the quantified information transmitted from the user side, to the user side. The user side performs operations and processing based on the information for coping with the problem received from the maintenance service side, and solves the problem of the device.

6 Claims, 11 Drawing Sheets

INFORMATION PROCESSING APPARATUS, DEVICE MANAGEMENT APPARATUS, NETWORK SYSTEM, METHOD OF COPING WITH A DEVICE PROBLEM, AND STORAGE MEDIUM

BACKGROUND OF THE INVENTION

1. Field of the Invention

The present invention relates to an information processing apparatus, a device management apparatus, a network system, a method of coping with a device problem, and a storage medium which are used in, for example, an apparatus or a system for managing a device such as a printer via a network.

2. Related Background Art

Conventionally, there is a system that is configured to manage a plurality of printers, which are connected over an arbitrary network, by a server via the network. Such a system is utilized such that a server on a maintenance service side for offering maintenance services of printers collectively manages printers on a user side.

Incidentally, in the above-mentioned conventional system, if a problem such as a lack of sheet and a sheet jam occurs in a printer on a user side, the printer can automatically sense the problem and notify a user of the problem. Thus, the user can cope with the problem by work such as that for supplying sheets and discharging sheets in response to the problem.

However, if a problem that is found by a user sensorily such as an unclear image as a result of print output, an edge smeared with black, a folded printed-out sheet occurs, a printer cannot automatically sense such a sensory problem. Thus, a user needs to inquire a method of coping with the problem from a maintenance service side by telephone or the like.

In addition, a printer notifies a user of not only such a sensory problem but also a problem such as the above-mentioned sheet jam after the problem actually occurs. Thus, the user also needs to inquire a method of coping with the problem from a maintenance service side by telephone or the like if the user wishes to cope with it before it actually occurs.

Therefore, conventionally, if there is a problem that is found by a user sensorily or if a user feels a sign of a problem which is not yet sensed by a printer, the user has to take an extremely bothersome procedure of inquiring a method of coping with the problem from a maintenance service side by telephone or the like.

In particular, if a maintenance service side manages printers of many users, it is very difficult for the maintenance service side to promptly respond to all the users' inquiries. In addition, if the maintenance service side does not promptly respond, an inquiring user is put on a state of waiting for a response concerning a method of coping with a problem or waiting for maintenance, during which the user may not be able to use a printer.

SUMMARY OF THE INVENTION

The present invention has been devised in view of the above and other drawbacks, and it is an object of the present invention to allow a user to easily cope with various problems of a device and to allow a maintenance service side to efficiently manage a device.

Other objects and features of the present invention will be apparent from the following descriptions taken in conjunction with the accompanying drawings, in which like reference characters designate the same or similar parts throughout the figures thereof.

DESCRIPTION OF THE PREFERRED EMBODIMENTS

Embodiments of the present invention will be hereinafter described with reference to the drawings.

First Embodiment

Figure 1:
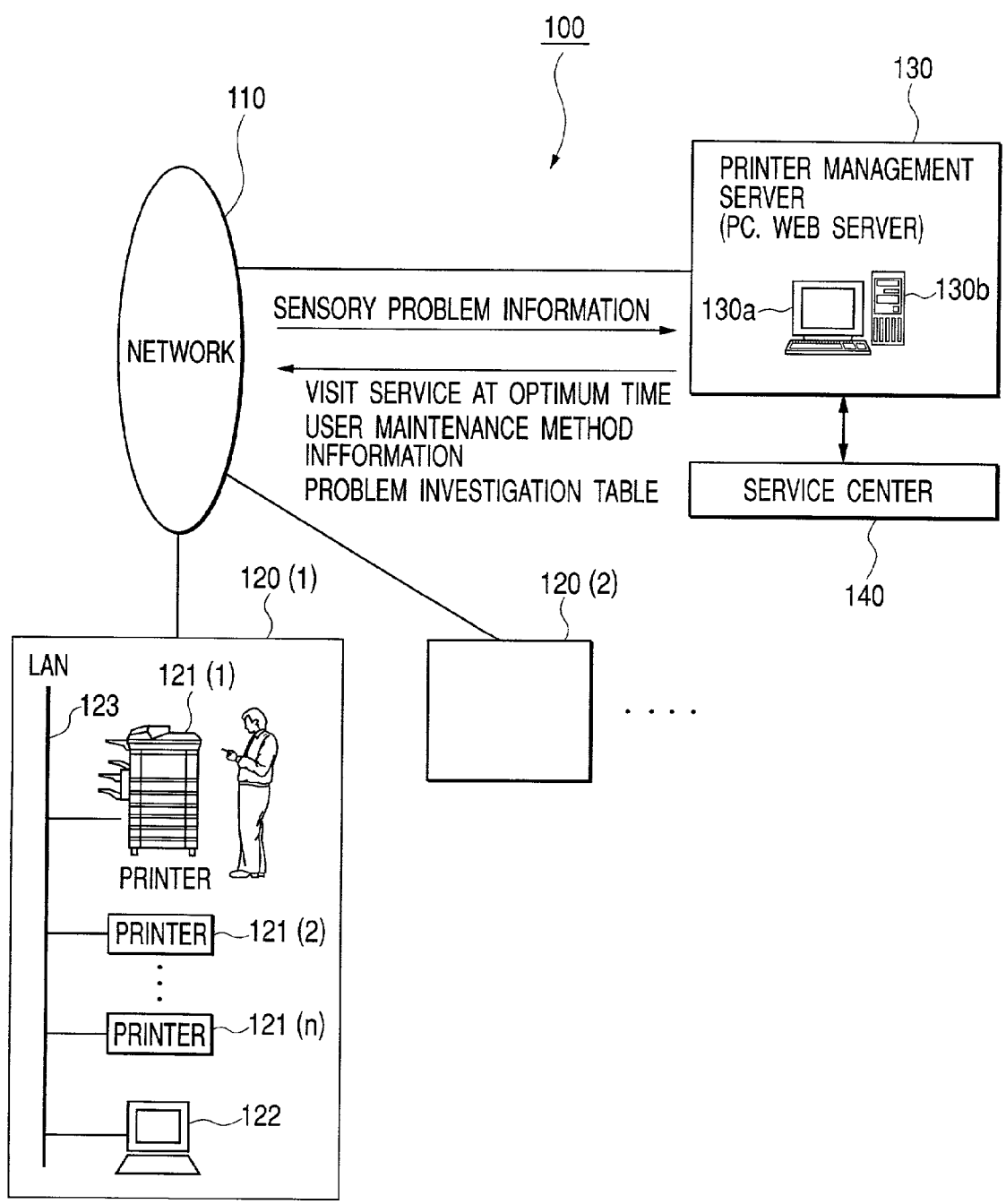
FIG. 1 is a block diagram showing a configuration of a network system to which the present invention is applied in a first embodiment.

The present invention is applied to, for example, a network system 100 shown in FIG. 1.

<Entire Configuration of the Network System 100>

The network system 100 has a configuration in which user sides 120(1), 120(2), . . . and a printer management server 130 for managing printers provided in the user sides 120(1), 120(2), . . . are communicatably connected via a network 110 such as the Internet.

The printer management server 130 includes a terminal apparatus (information processing apparatus) 130a such as a personal computer and a database 130b as described later. The printer management server 130 is communicatably connected to a service center (maintenance service side) 140 for offering maintenance services of printers provided on the user sides 120(1), 120(2), . . . via arbitrary communicating means (a network 110, a telephone, a facsimile machine or the like).

The plurality of user sides 120(1), 120(2), . . . correspond to office systems of an individual or a corporation. For example, the user side 120(1) has a configuration in which printers 121(1), 121(2), . . . 121(n) and a terminal apparatus (information processing apparatus) 122 such as a personal computer are communicatably connected via an LAN 123.

The printers 121(1), 121(2), . . . , 121(n) are printers being object of services in the service center 140, and are managed by the printer management server 130 via the network 110.

In addition, the printers 121(1), 121(2), . . . , 121(n) are configured such that they can be operated from the printers themselves and also can be operated from the terminal apparatus 122 via the LAN 123.

Further, an internal configuration of the user sides 120(1), 120(2), . . . is not limited to the above-mentioned internal configuration of the user side 120(1). That is, the internal configuration of the user sides 120(1), 120(2), . . . is not limited by the number of connected printers, the number of terminal apparatuses connected or the presence or absence of a terminal apparatus. For example, a user side (X) may be configured such that an operation similar to that on a terminal apparatus to be described later can be performed on an operation panel of a printer, and only the printer is provided for direct connection to the network 110. Details of an example of such a configuration will be described in a second embodiment.

In addition, although it is illustrated in FIG. 1 that the plurality of user sides 120(1), 120(2), . . . are provided, the number of user sides is not limited to this.

In addition, in the following description, the user side 120(1) will be considered among the user sides 120(1), 120(2), . . . for simplicity of the description.

<Terminal Apparatuses of the Printer Management Server 130 and the User Side 120(1)>

It is assumed that the terminal apparatus 130a of the printer management server 130 and the terminal apparatus 122 of the user side 120(1) have similar configurations, respectively.

Figure 2:
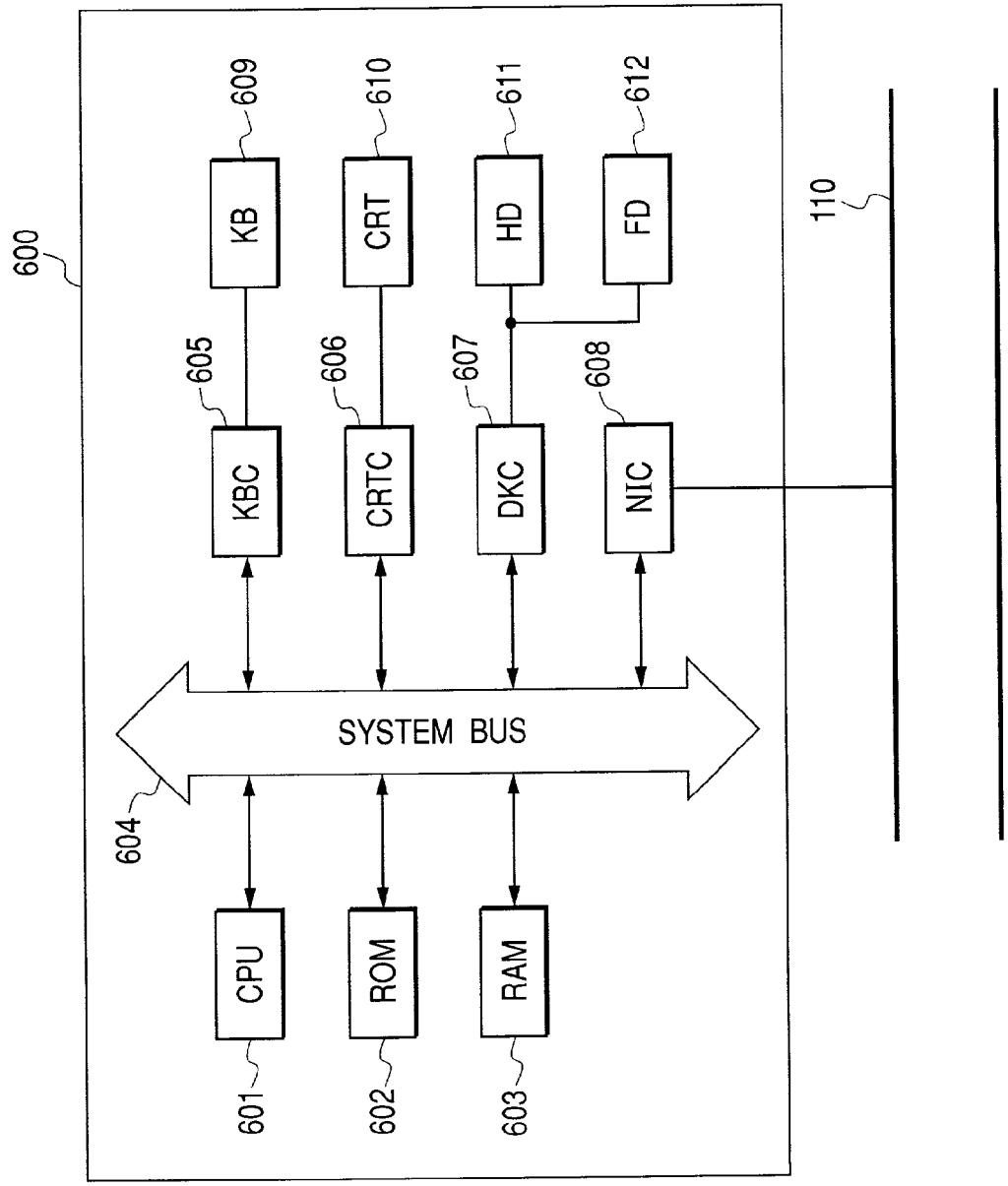
FIG. 2 is a block diagram showing an internal configuration of a terminal apparatus used in the above-mentioned network system.

For example, the terminal apparatus 130a and the terminal apparatus 122 have a function of a computer 600 configured as shown in FIG. 2, respectively, and operations of the system 100 in this embodiment is executed by a CPU 601 in the configuration.

As shown in the above-mentioned FIG. 2, the computer 600 has a configuration in which the CPU 601, an ROM 602, an RAM 603, a keyboard controller (KBC) 605 of a keyboard (KB) 609, a CRT controller (CRTC) 606 of a CRT display (CRT) 610 as a displaying portion, a disk controller (DKC) 607 for a hard disk (HD) 611 and a floppy disk (FD) 612, and a network interface card (NIC) 608 are mutually communicatably connected via a system bus 604.

The system bus 604 is connected to the Internet 110 shown in the above-mentioned FIG. 1.

The CPU 601 collectively controls each component connected to the system bus 604 by executing software stored in the ROM 602 or the HD 611 or software to be supplied from the FD 612.

That is, the CPU 601 reads out a processing program (software) in accordance with a processing sequence for implementing the operations of the system 100 from the ROM 602, the HD 611 or the FD 612 and executes it. Thus, the operations of the system 100 in this embodiment are realized.

The RAM 603 functions as a main memory, a work area or the like of the CPU 601.

The KBC 605 controls an input of an instruction from the KB 609, a pointing device (not shown) or the like.

The CRTC 606 controls display of the CRT 610.

The DKC 607 controls an access with the HD 611 and the FD 612 which store a boot program, various applications, an editing file, a user file, a network management program, a processing program to be executed from the CPU 601 and the like.

The NIC 608 sends and receives data to and from the user side 120(1), the printer management server 130 or the like on the network 110.

<A Functional Configuration of the Printer Management Server 130>

Figure 3:
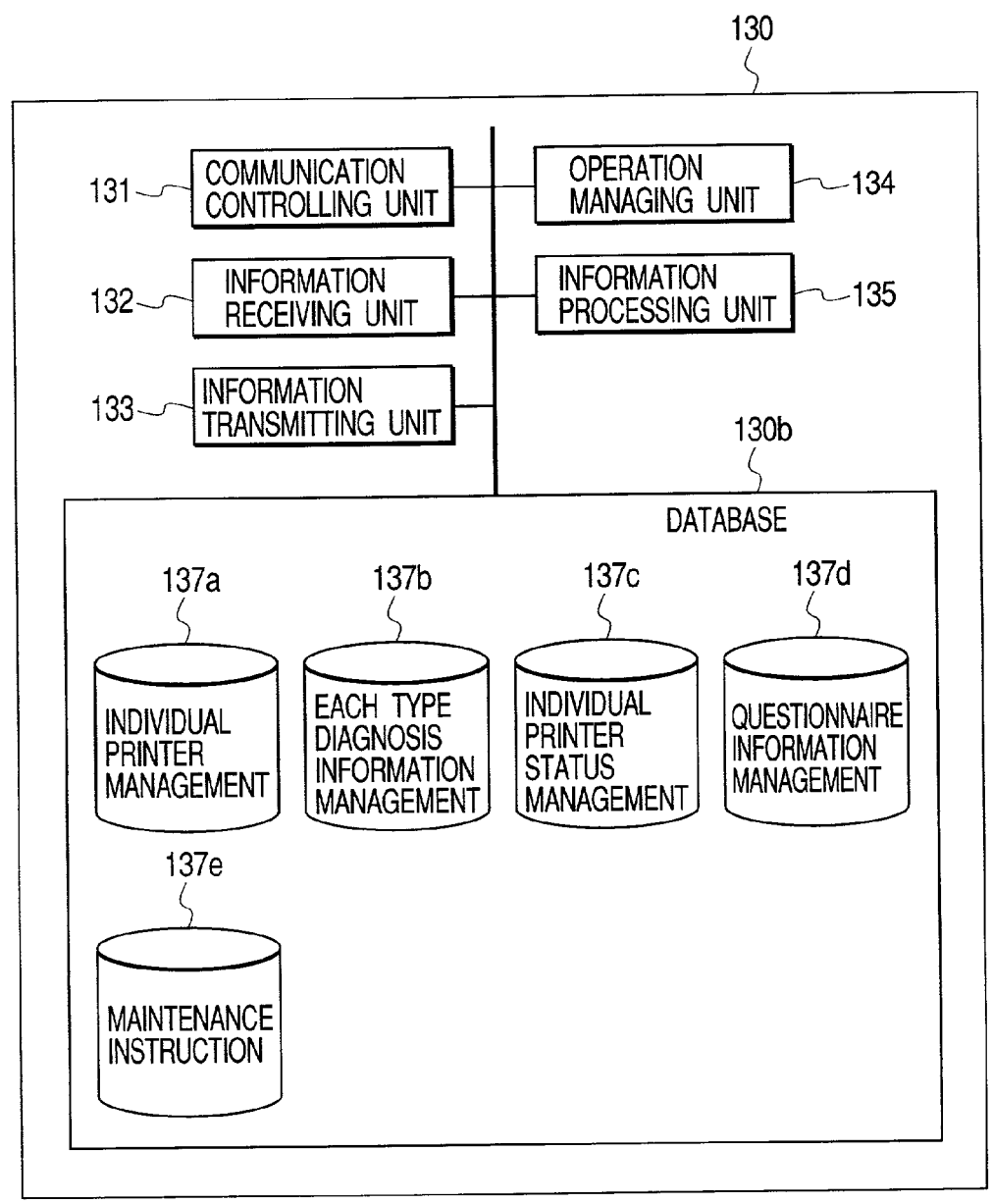
FIG. 3 is a block diagram showing a functional configuration of a printer management server of the above-mentioned network system.

FIG. 3 illustrates the configuration of the printer management server 130 functionally. As shown in the above-mentioned FIG. 3, the printer management server 130 is provided with an information receiving unit 132 for receiving information by communication via the network 110 or the like by the NIC 608, an information transmitting unit 133 for transmitting information by communication via the network 110 or the like by the NIC 608, a communication controlling unit 131 for controlling operations for transmitting and receiving of information in the information receiving unit 132 and the information transmitting unit 133, an operation managing unit 134 for managing operation of maintenance services by the system 100, and an information processing unit 135 for executing various kinds of processing for implementing operations of the system 100 to be described later.

Further, each of the components 131 to 135 shown in the above-mentioned FIG. 3 is realized by the CPU 601 shown in the above-mentioned FIG. 2 reading out and executing a processing program (software) stored in the ROM 602, the HD 611, the FD 612 or the like also shown in the above-mentioned FIG. 2.

In addition, the database 130b of the printer management server 130 includes an individual printer management area 137a, an each type diagnosis information management area 137b, an individual printer state management area 137c, a questionnaire information management area 137d, and a maintenance instruction area 137e.

Information (types of printers, user information and the like) concerning respective printers managed by the system 100 (hereinafter referred to as a "management printer") is held (registered) in the individual printer management area 137a. Here, a management printer refers to, for example, a printer for which an agreement for receiving maintenance services by the service center 140 has been concluded.

Diagnosis information for each type of a printer, which is required for diagnosis of a problem of a printer in which the problem occurred, is held in the each type diagnosis information management area 137b. More specifically, for example, diagnosis information such as a cause of a problem and parts of a printer that should be checked is held for each type of a printer concerning various possible problems. Further, diagnosis information is set for each type of a printer because information required for diagnosis of a problem is different for each type of a printer even if the problem is the same.

State information concerning a state of respective management printers is held in the individual printer state management area 137c. More specifically, for example, history information such as the number of times of occurrences (notifications) of failures and contents of the failures are held together with information on the number of prints to date in respective management printers.

Questionnaire information for making inquiries to users of a management printer is held in the questionnaire information management area 137d.

Maintenance instruction information concerning an instruction to be used when a user personally copes with a problem in a management printer is held in the maintenance instruction area 137e.

<Operations of the Network System 100>

Figure 4:
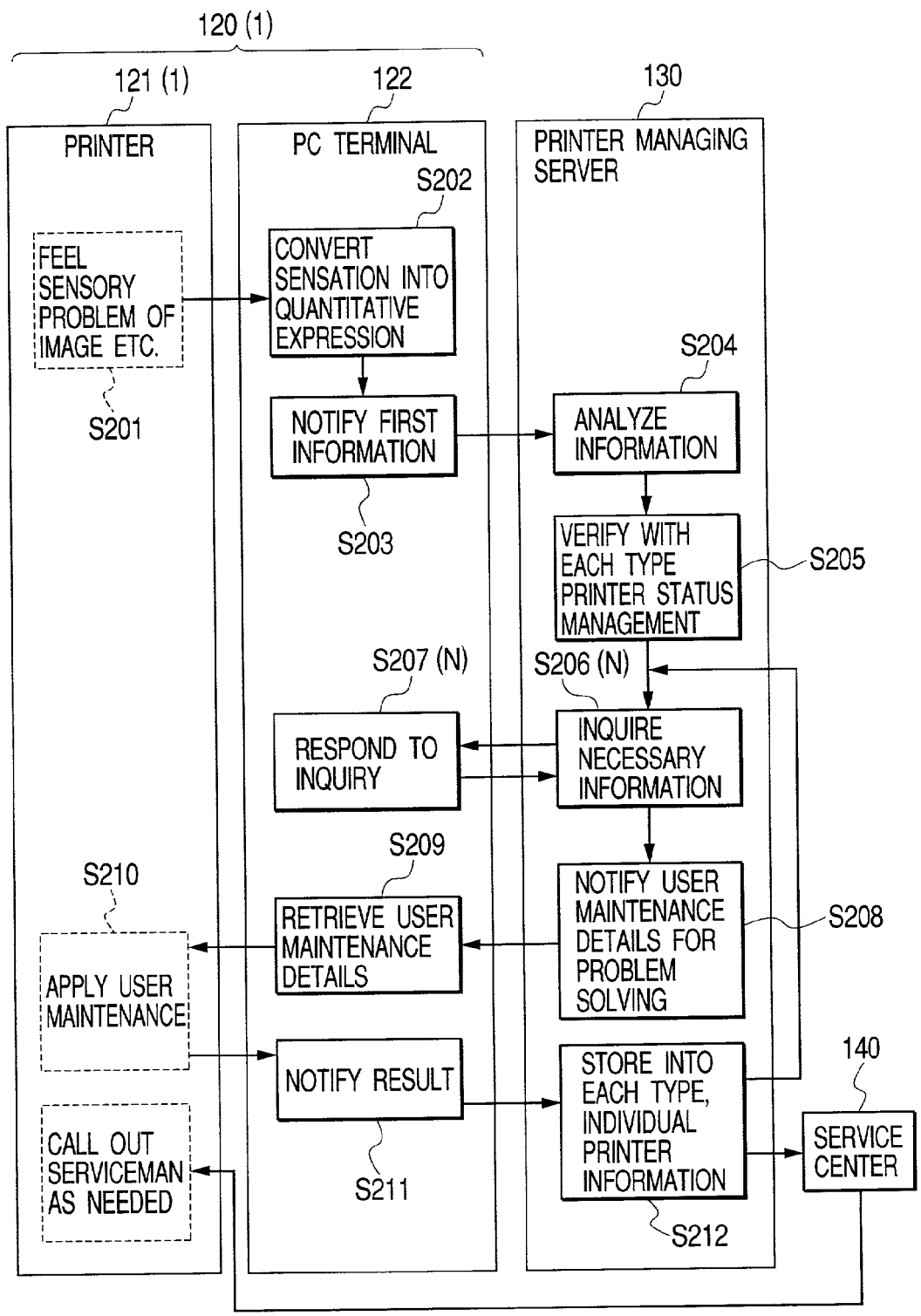
FIG. 4 is a flow chart for describing operations of the above-mentioned network system.

FIG. 4 shows operations of the network system 100. FIGS. 5 to 11 show an example of a display screen of the terminal apparatus 122 of the user side 120(1).

Step S201:

For example, if a problem occurs when a user uses the printer 121(1) in the user side 120(1), or if the user feels a sensory problem (such as a rather fogged image as a result of print output, an edge smeared with black, a printed sheet with a folded side) in the printer 121(1), the user performs operations for processing of the next step S202 onward by the KB 609 or a pointing device (not shown) of the terminal apparatus 122 in order to notify the printer management server 130 of the problem.

Figure 5:
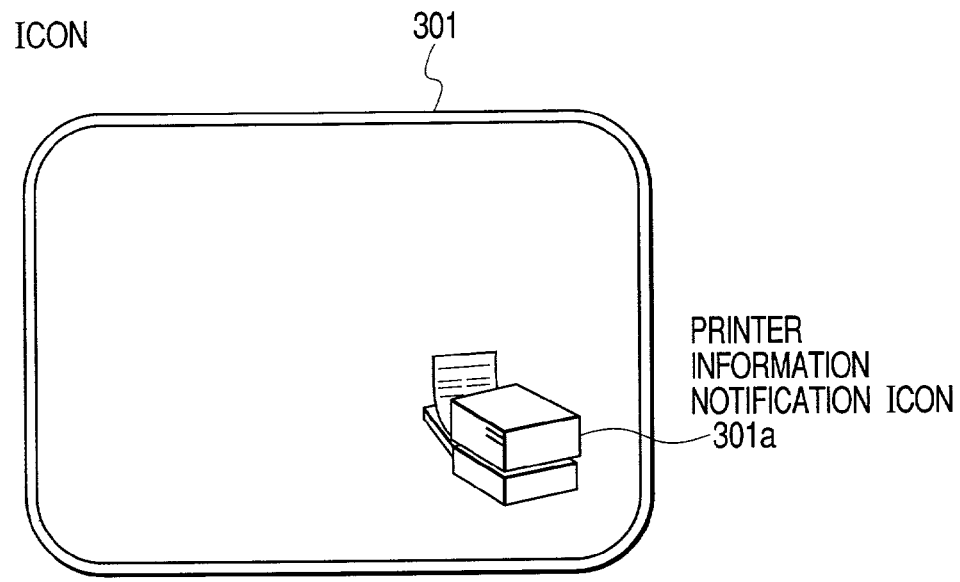
FIG. 5 illustrates a display screen (icon screen) on a user side of the above-mentioned network system.

Step S202;

First, a screen 301 of the above-mentioned FIG. 5 is displayed on the CRT 610 of the terminal apparatus 122. This screen 301 includes a printer information notification icon 301a. The user clicks the icons 301a of the screen 301 by the KB 609 or a pointing device (not shown). Further, the icon 301a can be set when a printer driver is installed in the terminal apparatus 122.

Figure 6:
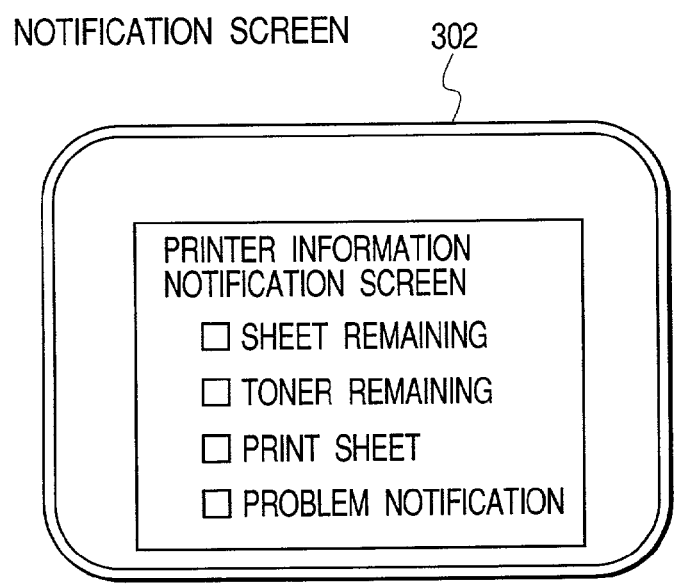
FIG. 6 illustrates a display screen (notification screen) on the user side of the above-mentioned network system.

When the icons 301a of the screen 301 is clicked, a screen 302 of the above-mentioned FIG. 6 is displayed on the CRT 610 of the terminal apparatus 122. On this screen 302, "sheet remaining", "toner remaining", "print sheet" and "problem notification" can be selected. The user selects "problem notification" by the KB 609 or a pointing device (not shown) in order to notify the printer management server 130 of the problem of the printer 121(1).

Figure 7:
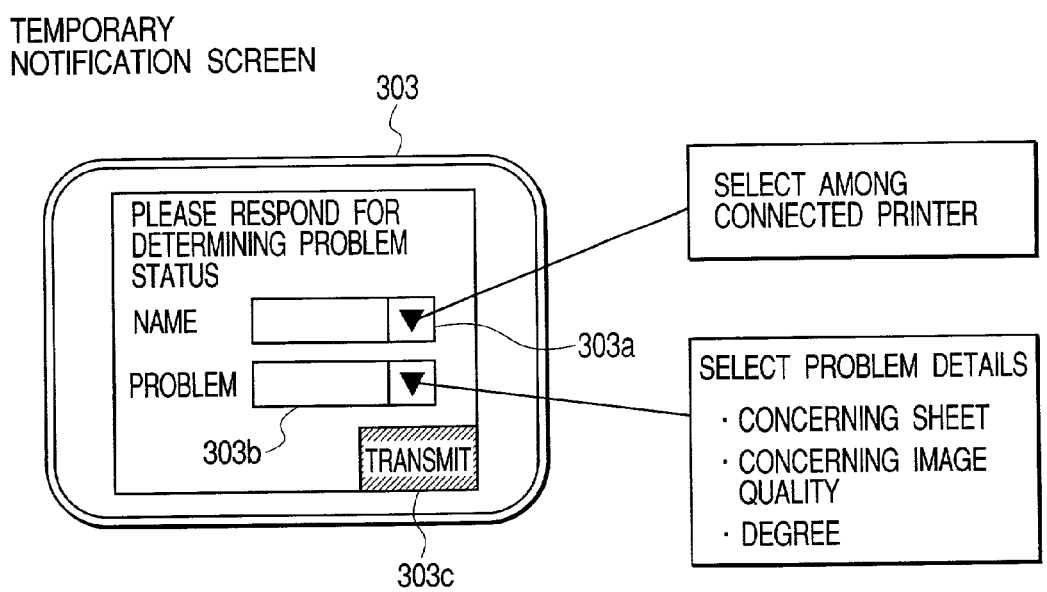
FIG. 7 illustrates a display screen (temporary notification screen) on the user side of the above-mentioned network system.

When "problem notification" on the screen 302 is selected, a screen 303 of the above-mentioned FIG. 7 is displayed on the CRT 610 of the terminal apparatus 122. A printer name inputting portion 303a, a problem inputting portion 303b and a transmission button 303c are provided on this screen 303.

The user can select a target printer (here, the printer 121(1)) out of the printers 121(1), 121(2), . . . , 121(n) included in the user side 120(1) by operating the mark "▼" on the right side of the printer name inputting portion 303a. In addition, printers connected with the terminal apparatus 122 are displayed as selectable ones in the inputting portion 303a.

The user can select a content of a pertinent problem out of various problems by operating the mark "▼" on the right side of the problem inputting portion 303b. For example, as shown in 401 of FIG. 12, a pertinent content of each of "concerning sheet", "concerning image quality" and "problem degree" can be selected in the inputting portion 303b. Contents that can be selected in "concerning sheet" include "sheet folded", "slanted printing", "double feed", "jam" and the like. Contents that can be selected in "concerning image quality" include "smeared with black", "blob", "white out", "blurred" and the like. Contents that can be selected in "problem degree" include "impossible to use", "terrible", "barely acceptable", "acceptable" and the like.

Further, a part indicated by "402" in the above-mentioned FIG. 12 will be described in a second embodiment.

The user selects the printer 121(1) in the inputting portion 303a and selects a problem (e.g., "concerning image quality→blob", "problem degree→barely acceptable") of the printer 121(1) by the KB 609 or a pointing device (not shown) on the screen 303 of the above-mentioned FIG. 7. Then, the user presses the transmission button 303c.

With the above-mentioned operations of a user, a problem of the printer 121(1) is converted to a quantitative expression (here, "concerning image quality→blob", "problem degree→barely acceptable"). In this way, this embodiment is configured such that a sensory problem can be analyzed, accumulated or otherwise processed in the printer management server 140 as data. This can be attained by quantifying a sensory problem by the hierarchical items shown in the above-mentioned FIG. 12. A sensory problem is a phenomenon differently perceived by each individual as in the case in which a user feels something is a problem whereas another user feels it is not depending on their individual senses.

Step S203:

When the transmission button 303c on the screen 303 of the above-mentioned FIG. 7 is pressed, information inputted in the screen 303 (first information) is transmitted to the printer management server 130 via the network 110.

Step S204:

The information receiving unit 132 receives the first information from the user side 120(1) in the printer management server 130. The information processing unit 135 recognizes a type of a printer in which a problem occurs (here, the printer 121(1)) according to the first information received by the information receiving unit 132. Then, the information processing unit 135 analyzes and diagnoses the problem using pertinent information in the each type diagnosis information management area 137b of the database 130b. In addition, the information processing unit 135 stores the first information received this time in the each printer state management area 137c of the database 130b as a history of problem notifications.

Step S205:

The information processing unit 135 compares information concerning the printer 121(1) in the each printer state management area 137c of the database 130b and the first information received this time if necessary according to the results of analysis and diagnosis of the problem in step S204. This is for recognizing if a problem was notified for the printer 121(1) in the past and, if a problem was notified, what kind of a problem it was, or the like.

Step S206(1):

If information concerning a problem is insufficient according to the results of comparison of problems in step S205, the information processing unit 135 inquires information concerning the problem from the user side 120(1). More specifically, the information processing section 135 generates an appropriate investigation table using information in the questionnaire information management area 137d of the database 130b based on the results of the analysis and diagnosis of the problem indicated by the first information received this time and the results of the comparison with the past problems. Then, the information processing section 135 transmits the investigation table to the user side 120(1) via the network 110 by the information transmitting unit 133.

Further, an investigation table is prepared anew in this embodiment. However, for example, investigation tables of a plurality of patterns may be held in advance as information in the each type diagnosis information management area 137*b* and the questionnaire information management area 137*d* of the database 130*b,* and a pertinent investigation table may be selected out of these investigation tables and transmitted to the user side 120(1).

Step S207(1)

Figure 8:
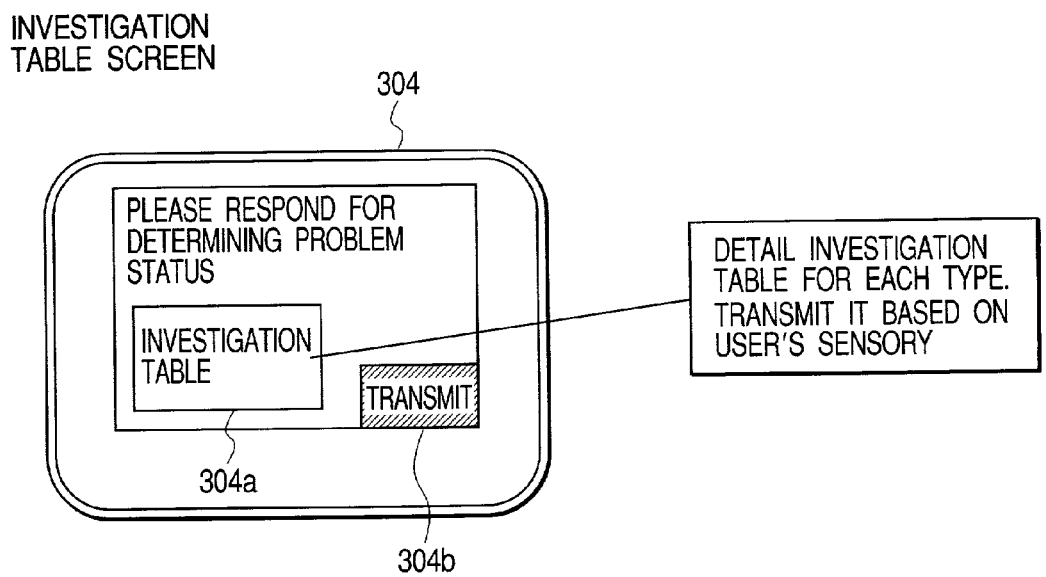
FIG. 8 illustrates a display screen (investigation table screen) on the user side of the above-mentioned network system.

In the user side 120(1), a screen 304 of the above-mentioned FIG. 8 is displayed on the CRT 610 of the terminal apparatus 122. An area 304*a* for the investigation table prepared in the information processing unit 135 of the printer management server 130 and a transmission button 304*b* are provided on this screen 301. Various items (questionnaire) for coping with a problem are described and an input column for answers to the items is provided in the investigation table area 304*a*.

The user inputs an answer to each item by the KB 609 or a pointing device (not shown) based on a situation which the user feels is a problem in using the printer 121(1), and presses the transmission button 304*b* on the screen 304 of the above-mentioned FIG. 8. Thus, information inputted on the screen 304 of the above-mentioned FIG. 8 is transmitted to the printer management server 130 via the network 110.

Step S206(2):

In the printer management server 130, the information receiving unit 132 receives the information transmitted from the user side 120(1) in step S207(1). The information processing unit 135 analyzes, diagnoses or otherwise processes the information received by the information receiving unit 132 in the similar manner as the processing in steps S204 and S205. Then, if necessary, the information processing unit 135 prepares an investigation table again and transmits it to the user side 120(1) via the network 110 by the information transmitting unit 133.

Figure 9:
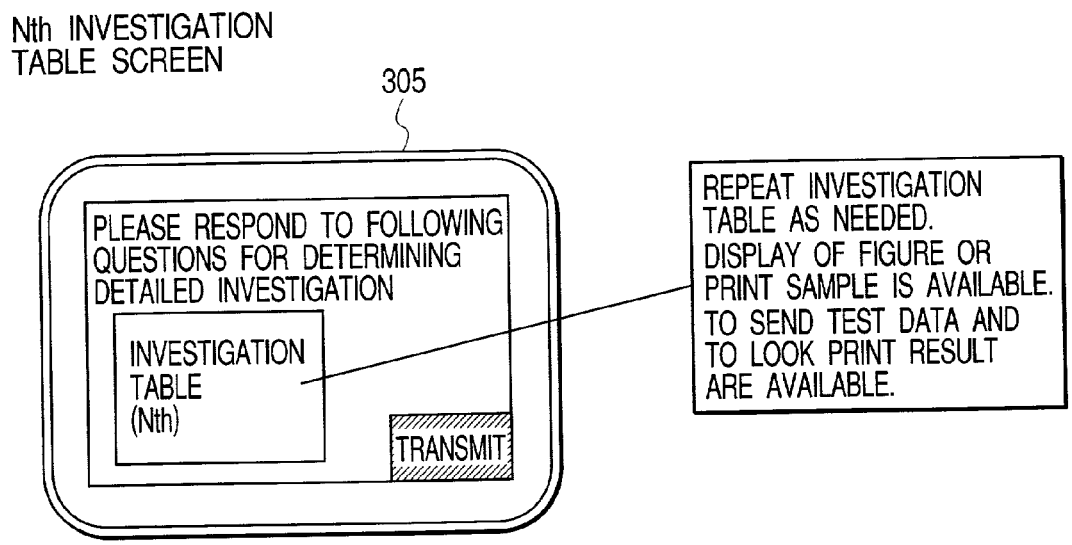
FIG. 9 illustrates a display screen (Nth investigation table screen) on the user side of the above-mentioned network system.

Step S207(2):

Following the screen 304 of the above-mentioned FIG. 8, a screen 305 of the above-mentioned FIG. 9 is displayed on the CRT 610 of the terminal apparatus 122 of the user side 120(1) by the processing of step S206(2), in which an answer to each item is inputted by the user. Then, information inputted in the screen 305 of the above-mentioned FIG. 9 is transmitted to the printer management server 130 via the network 110.

The above-mentioned steps S206 and S207 are repeatedly executed for a required number of times (N times). Thus, a problem situation of the printer 121(1) of the user side 120(1) is grasped quantitatively and in detail in the information processing unit 135 of the printer management server 130.

Further, a drawing or a print sample may be simultaneously displayed on the screens 304 and 305 shown in the above-mentioned FIGS. 8 and 9. Alternatively, print test data may be transmitted to the user side 120(1) together with the information of the screens 304 and 305, and results of the user's test data print by the printer 121(1) may be displayed on the screens 304 and 305.

Step S208:

The information processing unit 135 grasps the problem situation of the printer 121(1) quantitatively according to the exchange of information with the user side 120(1) in steps S206 and S207. Then, based on the results, the information processing unit 135 determines whether or not the user can actually cope with the problem of the printer 121(1) personally (whether or not it is expected that the problem will be solved by a maintenance operation of the user). As a result of this determination, if the user can actually cope with the problem of the printer 121(1) personally, the information processing unit 135 transmits information of a pertinent maintenance instruction in the maintenance instruction area 137*e* of the database 130*b* to the user side 120(1) via the network 110 by the information transmitting unit 133.

Further, in step S208, if the user cannot actually cope with the problem of the printer 121(1) personally, that is, the problem is so serious that the user cannot cope with it personally, the information processing unit 135 requests the service center 140 to call out a serviceman to the user side 120(1). For example, the information processing unit 135 automatically transmits information indicating to that effect to a terminal apparatus (e.g., a terminal apparatus for management having the configuration shown in the above-mentioned FIG. 2) in the service center 140. Alternatively, a person in charge on the printer management server 130 side notifies a person in charge on the service center 140 side by telephone, facsimile or the like. Thus, in such a case, a serviceman in the service center 140 visits the user side 120(1) and copes with the problem of the printer 121(1).

Figure 10:
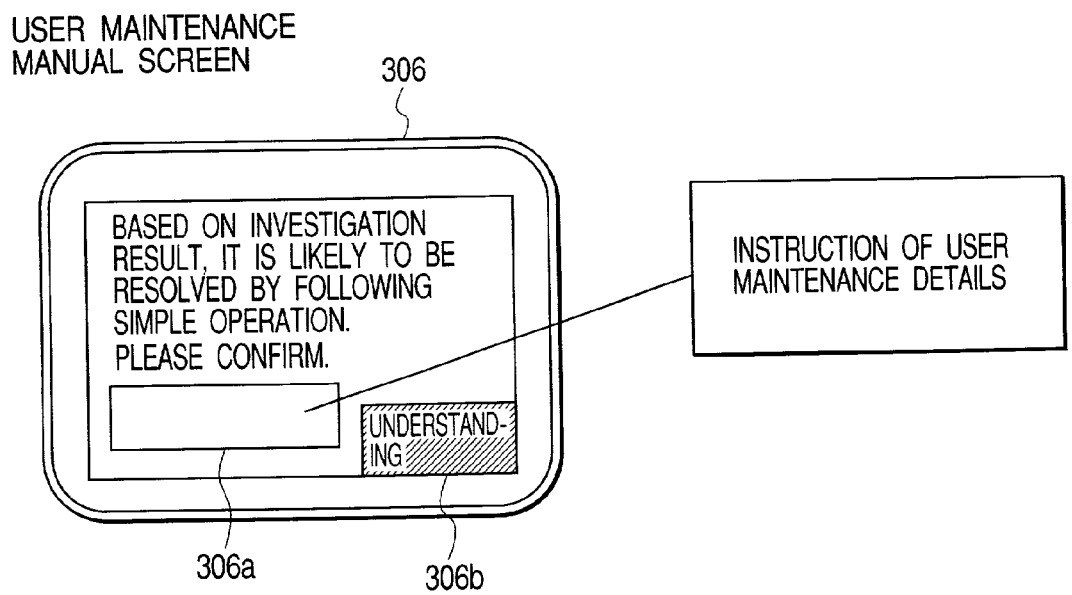
FIG. 10 illustrates a display screen (user maintenance manual screen) on the user side of the above-mentioned network system.

Step S209:

In the user side 120(1), a screen 306 of the above-mentioned FIG. 10 is displayed on the CRT 610 of the terminal apparatus 122. An area 306*a* for a maintenance instruction and an understand button 306*b* are provided on this screen 306.

Figure 11:
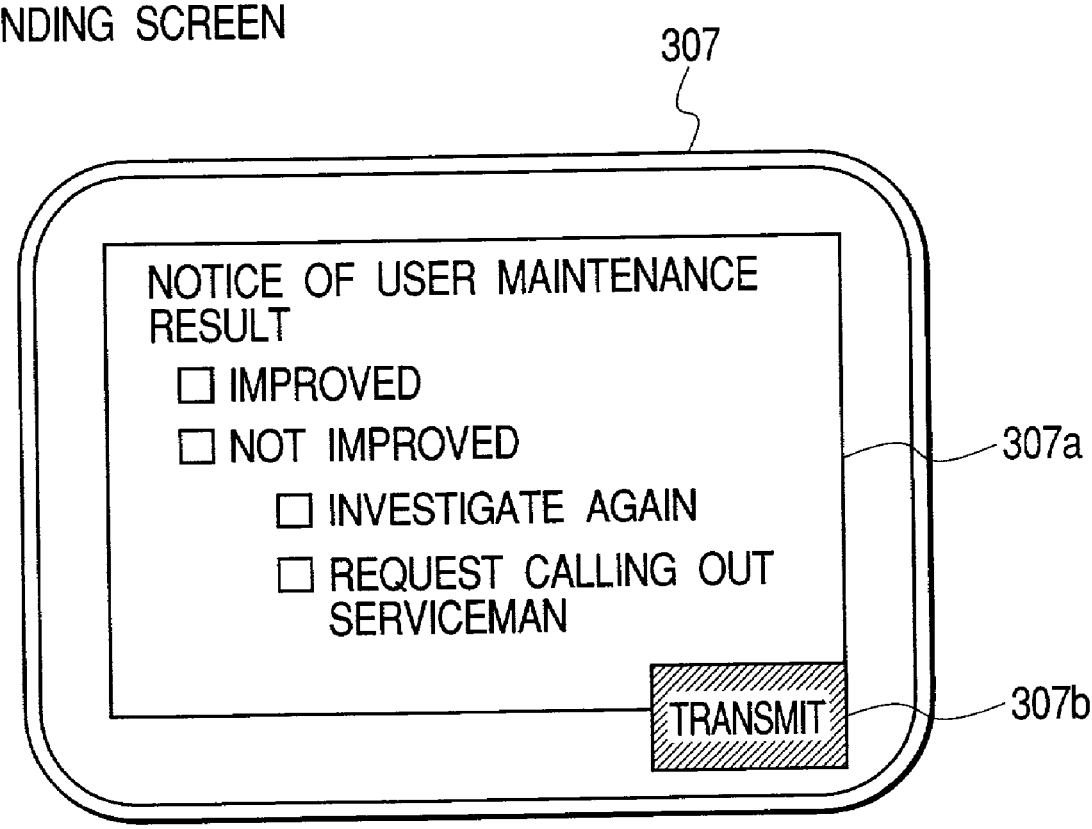
FIG. 11 illustrates a display screen (ending screen) on the user side of the above-mentioned network system.

Step S210:

The user refers to a maintenance instruction displayed on the area 306*a* of the screen 306 of the above-mentioned FIG. 10, and performs a maintenance operation to cope with the problem in the printer 121(1). Then, the user presses the understand button 306*b* on the screen 306 by the KB 609 or a pointing device (not shown). When the understand button 306*b* on the screen 306 of the above-mentioned FIG. 10 is pressed, a screen 207 of the above-mentioned FIG. 11 is displayed on the CRT 610 of the terminal apparatus 122. An area 307*a* for inputting a maintenance operation result and a transmission button 307*b* are provided on this screen 307. It is possible to select "improved", "not improved", "investigate again", "request calling out serviceman" and the like in the area 307*a* for inputting a maintenance operation result.

Step S211:

On the screen 307 of the above-mentioned FIG. 11, the user selects a pertinent item in an input area 307*a* based on a result of a maintenance operation with respect to the printer 121(1) and presses the transmission button 307*b* by the KB 609 or a pointing device (not shown). Thus, information inputted on the screen 307 of the above-mentioned FIG. 11 is transmitted to the printer management server 130 via the network 110.

Step S212:

When the information receiving unit 132 receives the information from the user side 120(1) in the printer management server 130, the information processing unit 135 executes a pertinent processing such as processing from step S206(N) onward again and processing for requesting the service center 140 to call out a serviceman based on the received information. Then, the information processing unit 135 stores the above-mentioned received information in the each printer state management area 137*c* of the database 130*b* as history information concerning the problem of this time.

As described above, according to this embodiment, when a user recognizes a sensory problem in the printer 121(X) when the user uses the printer 121(X) in the user side 120(X), the user can notify the printer management server 130 of a type or a degree of the problem by converting it to a quantitative expression, and the printer management server 130 can present a method of coping with the problem to the user of the user side 120(X). Thus, the user of the user side 120(X) is not required to inquire the problem from the service center 140 by telephone or the like as the user conventionally does, and can cope with the problem efficiently and promptly. In addition, if a problem of a degree that the printer 121(X) senses or it is impossible to use the printer 121(X) has not occurred yet but the user of the user side 120(X) feels a sign of a problem sensorily in the printer 121(X), the user also can notify the printer management server 130 accordingly and appropriately cope with the problem. That is, the user can cope with the problem while it is still insignificant and before it is too late. In addition, since the user of the user side 120(X) can request to call out a serviceman of the service center 140 only when a problem is highly emergency, costs for maintenance services can be reduced.

Therefore, according to the present invention, user satisfaction can be improved. In addition, a period of time when it is impossible to use a printer can be minimized, and a printer provided in the user side 120(X) can be efficiently operated.

Second Embodiment

In the first embodiment, the terminal apparatus 122 notifies the printer 121(X) in the user side 120(X) of a problem. On the other hand, in this embodiment, the printer 121(X) notifies the printer 121(X) of a problem.

Figure 13:
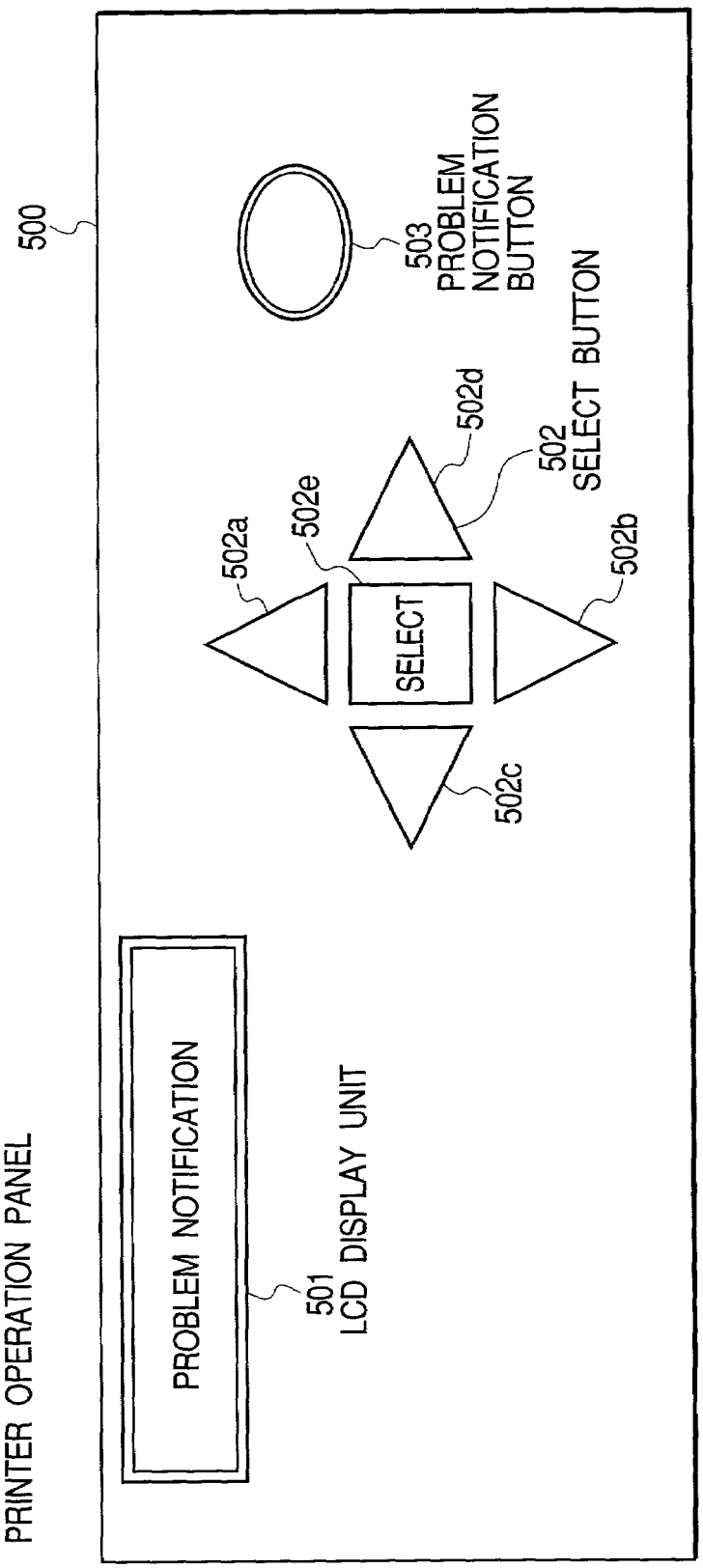
FIG. 13 illustrates an operation panel of a printer of the above-mentioned network system in a second embodiment.

For example, in the user side 120(1), an operation panel 500 as shown in FIG. 13 is provided in the printer 121(1). The operation panel includes a display 501 such as an LCD, a select button 502 and a problem notification button 503. The select button 502 includes up and down and left and right buttons 502*a* to 502*d* for selecting various items to be described later and a decision button 502*e*.

In addition, the printer 121(1) is provided with a function of the computer 600 shown in the above-mentioned FIG. 2. Operations in accordance with operations on the operation panel 500 to be described later are implemented by the CPU 601 in this computer 600.

Figure 14:
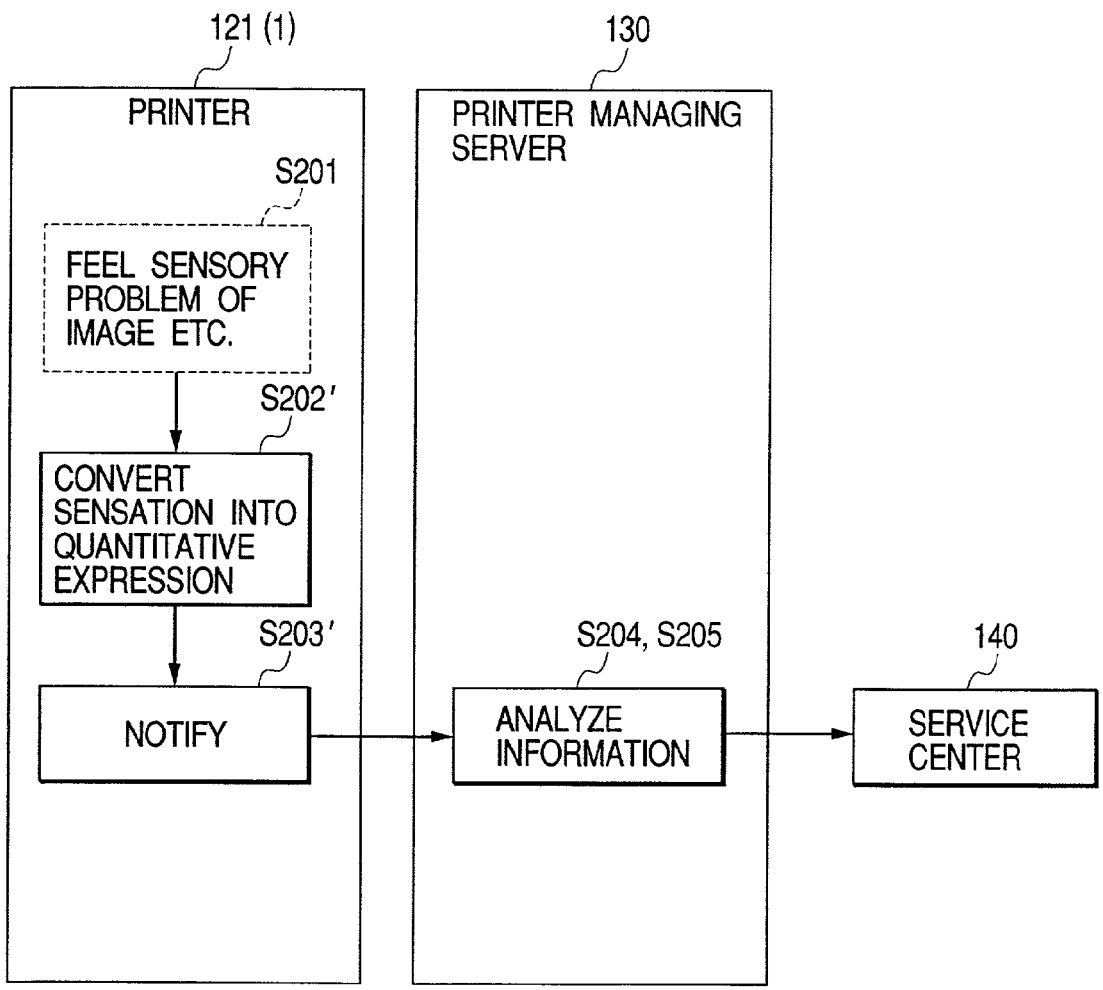
FIG. 14 is a flow chart for describing operations of the above-mentioned network system in the second embodiment.

FIG. 14 shows operations of the network system 100 in this embodiment. Further, the above-mentioned FIG. 14 illustrates the operations with a special attention paid mainly on operations different from those in the first embodiment (the operations indicated by the above-mentioned FIG. 4). Here, only the operations different from those in the first embodiment will be described specifically.

Step S201:

In the user side 120(1), for example, if a problem occurs in the printer 121(1) or if a user feels a sensory problem in the printer 121(1) when the user uses the printer 121(1), the user performs operations for processing from the next step S202' onward by the operation panel 500 of the printer 121(1) in order to notify the printer management server 130 of the problem.

Step S202':

The user presses the problem notification button 503 of the operation panel 500. Thus, the user can select the items concerning a problem as shown in the above-mentioned FIG. 12 by the select button 502 in the display 501 of the operation panel 500.

Figure 12:
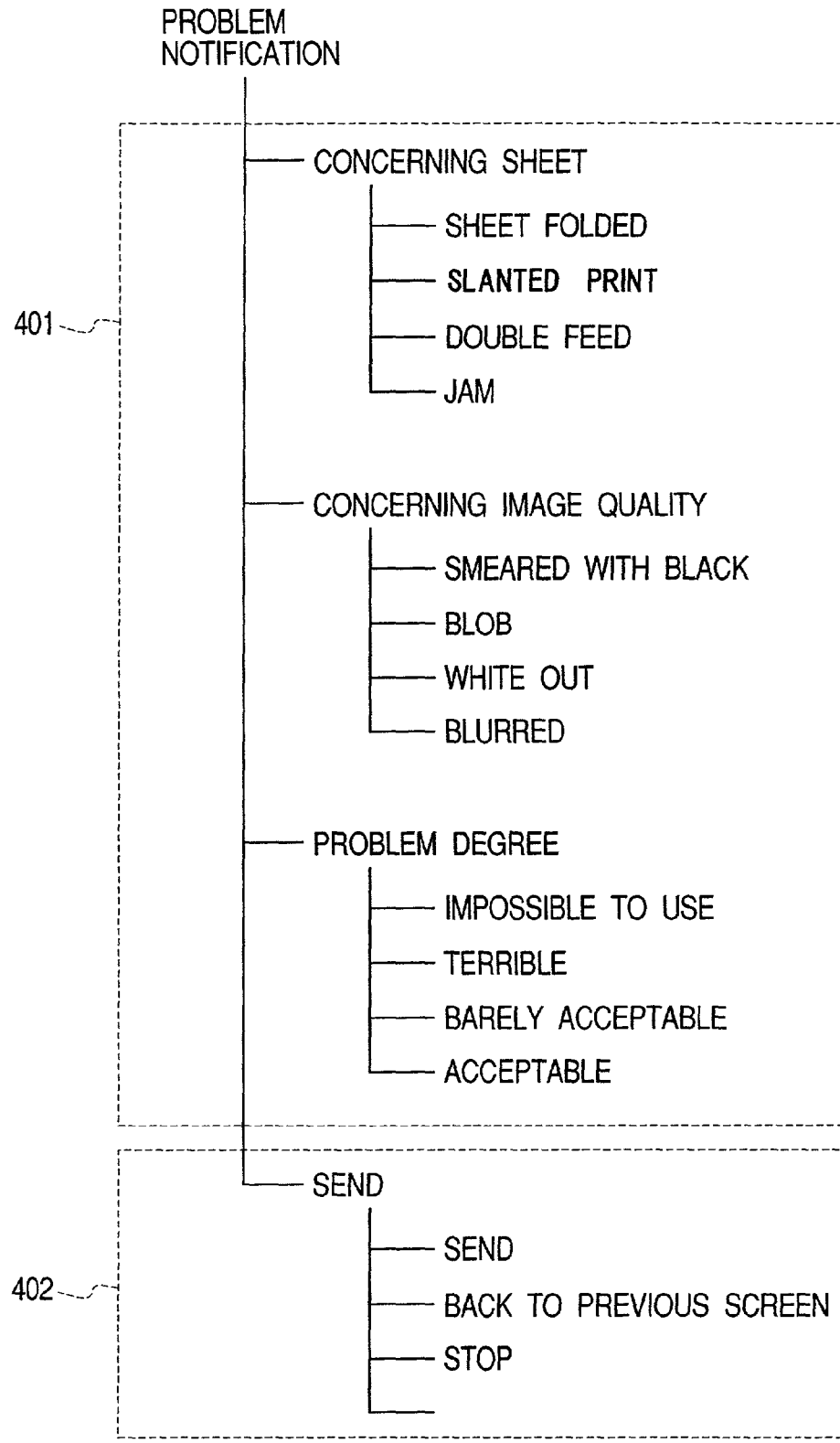
FIG. 12 illustrates information concerning a problem to be inputted in the above-mentioned temporary notification screen.

More specifically, hierarchical various items indicated by "401" and "402" of the above-mentioned FIG. 12 are displayed on the display 501 one after another. For example, the user can select an item concerning a problem by operating the up and down buttons 502*a* and 502*b* to move to an item in a upper or lower hierarchy, the left and right buttons 502*c* and 502*d* to display various items in a certain hierarchy, and the select button 502 and the decision button 502*e* to decides an item, respectively.

First, "problem notification" at the top is displayed on the display 501. In this state, the user presses the down button 502*b* of the select button 502. Thus, "concerning sheet", "concerning image quality", "problem degree" and "transmission" of the next hierarchy can be displayed one after another on the display 501.

The user operates the left and right buttons 502*c* and 502*d* to display "concerning sheet", "concerning image quality", "problem degree" and "transmission" on the display 501 one after another, and presses the decision button 502*e* when a desired item is displayed. Here, since it is necessary to input first whether a problem of the printer 121(1) is concerning a sheet or concerning image quality, the user presses the decision button 502*e* when, for example, "concerning sheet" is displayed.

Figure 15:
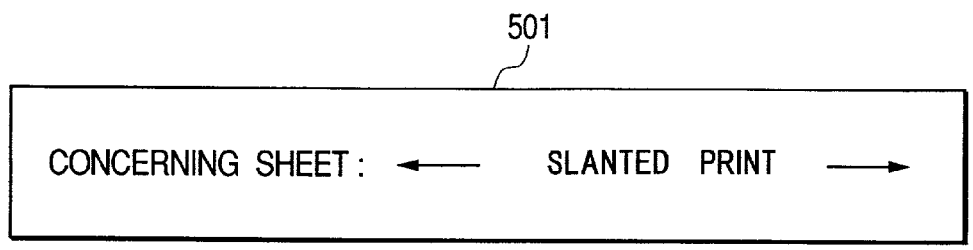
FIG. 15 illustrates an example of a screen of a display portion of the above-mentioned operation panel.

The user presses the down button 502*b* next in order to input a pertinent problem among the various problems of "concerning sheet". Thus, "sheet folded", "slanted printing", "double feed" and "jam" in the lower hierarchy of "concerning sheet" can be displayed one after another on the display 501. For example, a display state of the display 501 becomes a state shown in FIG. 15.

Then, the user operates the left and right buttons 502*c* and 502*d* to display "sheet folded", "slanted printing", "double feed" and "jam" on the display 501 one after another, and presses the decision button 502*e* when a pertinent item is displayed.

The user presses the up button 502*a* next in order to input a degree of the item of the problem inputted by the above-mentioned operation (e.g., "concerning sheet→sheet folded"). Thus, "concerning sheet", "concerning image quality", "problem degree" and "transmission" in the upper hierarchy can be displayed again one after another on the display 501.

The user operates the left and right buttons 502*c* and 502*d* to display "concerning sheet", "concerning image quality", "problem degree" and "transmission" on the display 501 one after another, and presses the decision button 502*e* when a desired item (here, "problem degree") is displayed.

The user presses the down button 502*b* next in order to input a pertinent item among various items of "problem degree". Thus, "impossible to use", "terrible", "barely acceptable" and "acceptable" in the lower hierarchy of "problem degree" can be displayed one after another on the display 501.

The user operates the left and right buttons 502*c* and 502*d* to display "impossible to use", "terrible", "barely acceptable" and "acceptable" on the display 501 one after another, and presses the decision button 502*e* when a desired item is displayed.

With the above-mentioned operations of the user, the problem of the printer 121(1) is converted to a quantitative expression (here, "concerning sheet→sheet folded", "problem degree→barely acceptable" or the like".

Step S203'

The user presses the up button 502*a* next in order to transmit the information inputted in step S202' to the printer management server 130. Thus, "concerning sheet", "concerning image quality", "problem degree" and "transmission" in the upper hierarchy can be displayed again one after another on the display 501.

The user operates the left and right buttons 502*c* and 502*d* to display "concerning sheet", "concerning image quality", "problem degree" and "transmission" on the display 501 one after another, and presses the decision button 502e when a desired item (here, "transmission") is displayed.

The user presses the down button 502b next in order to input a pertinent item among various items of "transmission. Thus, "transmit", "back to previous screen" and "stop" in the lower hierarchy of "transmission" can be displayed one after another on the display 501.

Then, the user operates the left and right buttons 502c and 502d to display "transmit", "back to previous screen" and "stop" on the display 501 one after another, and presses the decision button 502e when a desired item (here, "transmit") is displayed. Thus, information that is the problem of the printer 121(1) converted to a quantitative expression (here, "concerning sheet→sheet folded", "problem degree→barely acceptable") is transmitted to the printer management server 130 via the network 110.

Step S204, Step S205

In the printer management server 130, the information receiving unit 132 analyzes, diagnoses and otherwise processes the information from the user side 120(1) as in the first embodiment, and requests the service center 140 to call out a serviceman according to results of the analysis, diagnosis or the like.

As described above, according to this embodiment, since the user can notify a problem from the printer 121(1) as well, the user can immediately notify a problem on site while actually looking at a situation of the printer 121(1) in the user side 120(X).

Further, although the user requests the service center 140 to call out a serviceman if necessary after the processing of steps S204 and S205 in the second embodiment, the present invention is not limited to this, and detailed information may be exchanged by an investigation table or a maintenance instruction may be provided as in the first embodiment. In this case, it is sufficient to give the display 501 of the operation panel 500 display and input functions similar to those in the terminal apparatus 122.

In addition, the first and the second embodiments deals with a notification concerning a problem of a printer managed by the printer management server 130 (a printer for which an agreement for receiving maintenance services by the service center 140 has been concluded). However, the present invention is not limited to this and may deal with a notification of a problem of other printers on the network 110. For example, the network system in accordance with the present invention may be arranged such that, if a printer indicated by a problem notification from a user side is a printer that is not registered in the individual printer management area 137a of the database 130b, information for urging the notifying user side to register the printer (to conclude an agreement for receiving maintenance services by the service center 140) is transmitted, and the services by the first and the second embodiments are provided after the registration is confirmed. Alternatively, services may be provided for a first problem notification (services are allowed only once).

In addition, although a device to be managed is a printer in the first and the second embodiments, the present invention is not limited to this, and can be applied to various devices (a scanner, a copying machine or the like).

In addition, it is needless to mention that the object of the present invention can also be attained by supplying a storage medium having a program code of software for realizing the functions of the first and the second embodiments stored thereon to a system or an apparatus, and a computer (or a CPU or an MPU) of the system or the apparatus reading out the program code stored in the storage medium.

In this case, the program code itself read out from the storage medium realizes the functions of the first and the second embodiments, and the storage medium having the program code stored thereon constitutes the present invention.

As a storage medium for supplying a program code, an ROM, a floppy disk, a hard disk, an optical disk, an magneto-optical disk, a CD-ROM, a CD-R, a magnetic tape, a nonvolatile memory card and the like can be used.

The functions of the first and the second embodiments are realized by a computer executing a read-out program code. However, it is needless to mention that an OS or the like running on the computer executes a part of or entire actual processing based on instructions of the program code, and the functions of the first and the second embodiments are also realized by the processing.

Moreover, a program code read out from a storage medium is written in a memory provided in a function extending board inserted in a computer or an function extending unit connected to the computer. It is also needless to mention that a CPU or the like provided in the function extending board or the function extending unit then executes a part of or entire actual processing based on instructions of the program code, and the functions of the first and the second embodiments are realized by the processing.

As described above, according to the present invention, a user side of a device (a printer or the like) quantifies a problem (a sensory problem or the like) that a user feels when the user uses the device and transmits it to a management side of the device, and the management side of the device then returns information for coping with the problem (information of an instruction for a user to carry out maintenance personally, or the like) based on the quantified information transmitted from the user side. Thus, the user on the user side is not required to inquire the problem from a maintenance service center by telephone or the like as the user conventionally does, and the user can cope with any problem efficiently and promptly.

In addition, the user on the user side can also properly cope with a subtle problem before a problem actually occurs in a device (a problem as a sign showing that a device will be unusable). That is, the user can cope with the problem while the problem is not so serious and before it is too late. In addition, since the user on the user side can request a maintenance service center to call out a serviceman to the user side only when a problem is highly urgent, costs for maintenance services can be reduced.

Therefore, according to the present invention, user satisfaction can be improved, downtime can be reduced, and an operating ratio of a device provided on a user side can be maximized.

Thus, it is seen that an information processing apparatus, a device management apparatus, a network system, a method of coping with a device problem, and a storage medium are provided. One skilled in the art will appreciate that the present invention can be practiced by other than the preferred embodiments which are presented for the purposes of illustration and not of limitation, and the present invention is limited only by the claims which follow.

What is claimed is:

1. A management system which includes a management service providing apparatus which is capable of communicating with a user communication apparatus via a network:

said user communication apparatus comprising, image forming apparatus information input means for inputting information for identifying an image forming apparatus having a problem;

problem details input means for inputting details of the problem which occurred in said image forming apparatus;

display means for displaying said problem details and a list of concerning problem degrees;

selection means for selecting a problem degree from said list; and transmitting means for transmitting said selected problem degree to the service providing apparatus:

said management service providing apparatus comprising:

receiving means for receiving the problem degree from said user communication apparatus; and analyzing means for analyzing said received problem degree.

2. A apparatus, which is capable of communicating with an external apparatus comprising:

image forming apparatus information input means for inputting information for identifying an image forming apparatus having a problem;

problem details input means for inputting details of the problem which occurred in said image forming apparatus;

display means for displaying said problem details and a list of concerning problem degrees;

selection means for selecting a problem degree from said list; and transmitting means for transmitting said selected problem degree to the external apparatus.

3. A apparatus according to claim 2, further comprising receiving means for receiving designation information concerning the problem degree transmitted from said transmitting means from said external apparatus.

4. A apparatus according to claim 2, accommodating an image forming apparatus.

5. A method of controlling a apparatus which is capable of communicating with an external apparatus, comprising:

an image forming apparatus information input step of inputting information for identifying an image forming apparatus having a problem;

a problem details input step of inputting details of the problem which occurred in said image forming apparatus;

a display step of displaying said problem details and a list of concerning problem degrees;

a selection step of selecting a problem degree from said list; and a transmitting step of transmitting said selected problem degree to the external apparatus.

6. A computer-readable program comprising program codes for controlling a apparatus which is capable of communicating with an external apparatus, comprising:

an image forming apparatus information input step of inputting information for identifying an image forming apparatus having a problem;

a problem details input step of inputting details of the problem which occurred in said image forming apparatus;

a display step of displaying said problem details and a list of concerning problem degrees;

a selection step of selecting a problem degree from said list; and a transmitting step of transmitting said selected problem degree to the external apparatus.

* * * * *